(12) United States Patent
Harasti et al.

(10) Patent No.: US 8,536,983 B2
(45) Date of Patent: Sep. 17, 2013

(54) UNDERWATER RFID ARRANGEMENT FOR OPTIMIZING UNDERWATER OPERATIONS

(75) Inventors: Tracy J Harasti, Arnold, MD (US); James E Howell, Severn, MD (US); William M Hertel, III, Annapolis, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 306 days.

(21) Appl. No.: 12/905,405

(22) Filed: Oct. 15, 2010

(65) Prior Publication Data

US 2011/0095865 A1 Apr. 28, 2011

Related U.S. Application Data

(60) Provisional application No. 61/254,868, filed on Oct. 26, 2009, provisional application No. 61/328,440, filed on Apr. 27, 2010.

(51) Int. Cl.
*H04Q 5/22* (2006.01)

(52) U.S. Cl.
USPC .......... 340/10.1; 700/245; 700/253; 700/257; 15/319; 701/21

(58) Field of Classification Search
USPC .......... 340/10.1; 700/245, 253, 257; 701/21; 15/319; 455/456.6; 114/313, 222
See application file for complete search history.

(56) References Cited

U.S. PATENT DOCUMENTS

| | | | |
|---|---|---|---|
| 5,947,051 A * | 9/1999 | Geiger | 114/313 |
| 7,204,409 B2 | 4/2007 | Kumar et al. | |
| 7,877,166 B2 * | 1/2011 | Harwig et al. | 700/253 |
| 7,971,547 B1 * | 7/2011 | Hertel et al. | 114/222 |
| 2005/0027453 A1 | 2/2005 | Fort et al. | |
| 2006/0292984 A1 | 12/2006 | Teate et al. | |
| 2007/0194919 A1 | 8/2007 | Blanche et al. | |
| 2007/0254676 A1 * | 11/2007 | Pedigo et al. | 455/456.6 |
| 2007/0290941 A1 | 12/2007 | Brown et al. | |
| 2008/0122704 A1 | 5/2008 | King | |
| 2008/0129534 A1 | 6/2008 | Blanche et al. | |
| 2008/0198000 A1 | 8/2008 | Rodgers | |
| 2009/0189784 A1 * | 7/2009 | Lindgren | 340/945 |
| 2010/0013664 A1 | 1/2010 | Zierolf | |
| 2010/0114372 A1 * | 5/2010 | Knuth et al. | 700/257 |

OTHER PUBLICATIONS

Design World Online, Hull Cleaning Robot for Large Ships; Roger Hess; Aug. 10, 2010.
Wireless Net Design Line Technonline Community; RFID creates interactive Experience at Singapore Aquarium; K. C. Jones.

(Continued)

*Primary Examiner* — Daniel Wu
*Assistant Examiner* — Benyam Haile
(74) *Attorney, Agent, or Firm* — Dave A. Ghatt

(57) ABSTRACT

A method and system to optimize underwater operations utilizing a radio frequency identification (RFID) arrangement. The RFID arrangement includes a plurality of RFID tags positioned on an underwater surface, with each of the plurality of tags coded with unique information related to each tag's location on the underwater surface. The RFID system also includes an RFID reader/interrogator attached to an underwater explorer. When the underwater explorer is within a reading range of a tag, the reader/interrogator reads the unique tag information. The tag information is used to optimize underwater operations performed by the explorer, which may be a diver or a water vessel.

18 Claims, 6 Drawing Sheets

(56) References Cited

OTHER PUBLICATIONS

RFID Journal; RFID Lures Maker of Electronic Lobster Callers; Jeremy Black; Jun. 8, 2007.

RFID Journal; Mining the Benefits of RFID; Apr. 1, 2006; Elizabeth Wasserman.
HISMAR News Report No. 2.2008.
HISMAR News Report No. 1.2007.

* cited by examiner

US 8,536,983 B2

UNDERWATER RFID ARRANGEMENT FOR OPTIMIZING UNDERWATER OPERATIONS

CROSS-REFERENCE TO RELATED APPLICATIONS

This application claims the benefit of U.S. Provisional Application No. 61/254,868, entitled, "Underwater RFID Arrangement for Maximizing Underwater Vessel Operations," filed Oct. 26, 2009, which is incorporated herein by reference.

This application is related to U.S. nonprovisional patent application No. 61/328,440, filing date Apr. 27, 2010, hereby incorporated herein by reference, entitled "Miniature Robotic Hull Grooming Vehicle" by joint inventors William Martin Hertel III, Donald T. Darling, and Kenneth W. Holappa.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an underwater radio frequency identification (RFID) arrangement, for optimizing underwater operations, and in particular, an RFID arrangement including a plurality of RFID tags carrying unique information, and an RFID reader/interrogator for reading the unique information carried on the plurality of tags.

BACKGROUND

Current and previous methods of determining a precise location of a vehicle when underwater on a ships' hull or the vehicle's direction of travel on the hull are based on acoustic or sonar systems. These systems transmit hi-frequency sound waves through the water and register the vibrations reflected back from the desired object. Positioning is then determined by sonar triangulation, a surveying method that provides coordinates of where the desired object is in reference to a "baseline station" which acts as a marker or reference point for navigation. A basic system would consist of fixed and mobile transponders/beacons and a computer with a software program that determines the relative position of the mobile transponder(s) in relation to the fixed one.

There are several disadvantages associated with these types of systems. First, they use active high powered systems that transmit sound waves underwater, which is not desired. Additionally, these systems are expensive and high maintenance. For example, in order to work properly these systems require continual re-deployment and calibration of the beacons. Also, a large learning curve for the operators is also required.

SUMMARY

In one aspect, the invention is an underwater operations optimization system. The system includes a water vessel having a submerged hull surface. The system also includes a plurality of underwater radio frequency identification tags positioned along the submerged hull surface. In this aspect, each tag of the plurality of tags has unique identification data related to the positioning of said tag on the hull surface. According to the invention, the system further includes an underwater explorer for travelling along the submerged hull surface. The underwater explorer includes a radio frequency identification reader, for reading the unique identification data of each tag when the reader comes within a reading range.

In another aspect, the invention is an underwater location system. The underwater location system includes a plurality of underwater radio frequency identification tags positioned along an underwater surface. In this aspect, each tag of the plurality of tags has unique identification data related to the positioning of the tag on the surface. The underwater location system also includes an underwater explorer for travelling in close proximity to the underwater surface. The underwater explorer includes a radio frequency identification reader attached thereon, for reading the unique identification data of each tag when the reader comes within a reading range as the underwater explorer travels in close proximity to the underwater surface.

BRIEF DESCRIPTION OF THE DRAWINGS

Other features will be apparent from the description, the drawings, and the claims.

DETAILED DESCRIPTION

Figure 1A:
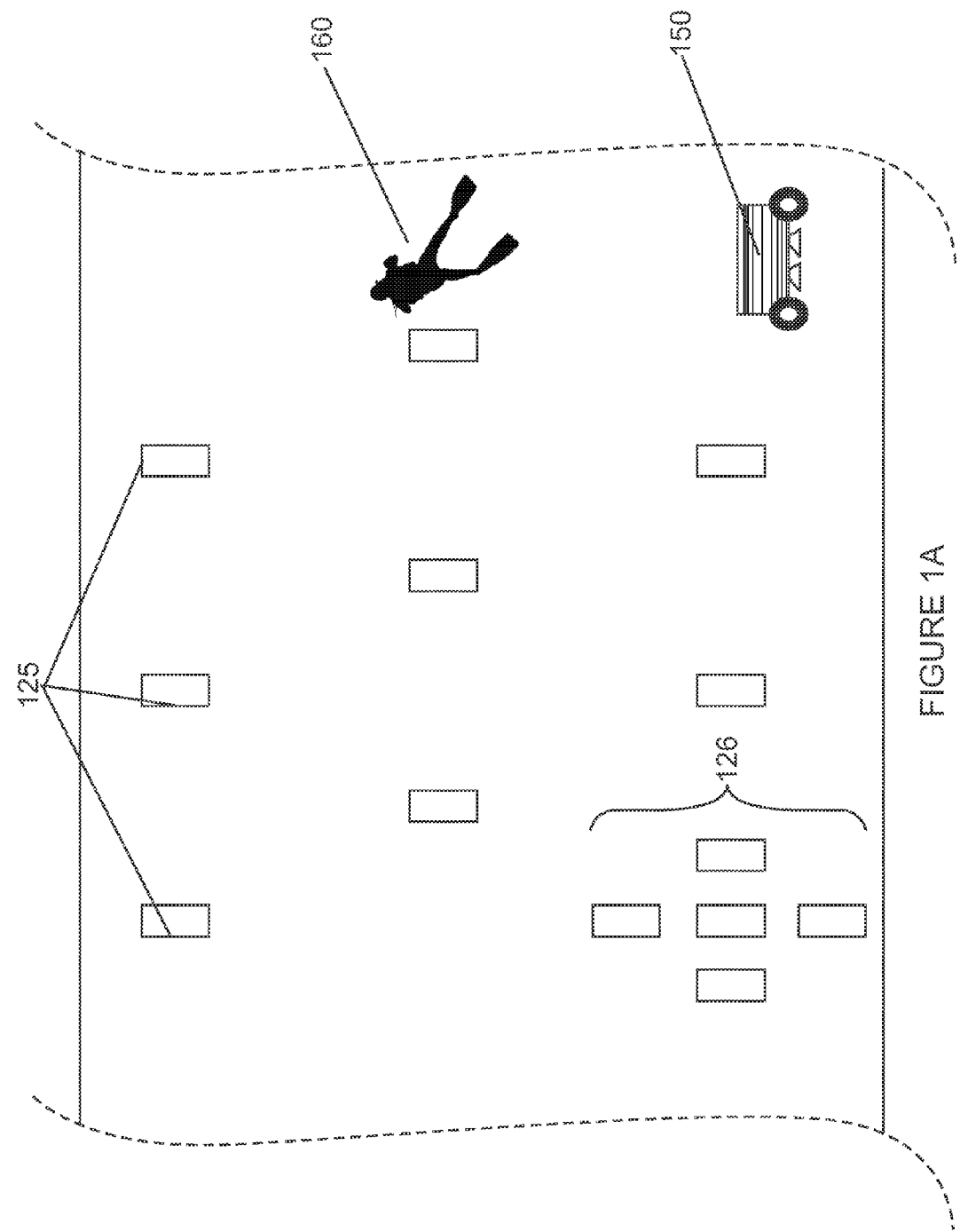
FIG. 1A is an illustration of an underwater location system utilizing an RFID arrangement, according to an embodiment of the invention.

The invention relates generally to an arrangement that uses radio frequency identification (RFID) technology to optimize underwater operations by determining an exact underwater location of an underwater explorer. The arrangement may also optimize underwater operations by determining orientation and direction of motion of the underwater explorer. FIG. 1A is an exemplary illustration of such a system. FIG. 1A illustrates an underwater location system 10 utilizing an RFID arrangement, according to an embodiment of the invention. As shown, the system 10 includes a submerged surface 101. The surface 101 may have any desired geometry. The surface 101 may be the surface of a water vessel such as a ship or a submarine, or the like. Alternatively, the surface may be a non-vessel surface, such as a submerged surface at a dock, a dam wall, or even the surface of an object.

FIG. 1A also shows an underwater explorer, a mobile unit 150 for travelling along or over the surface 101. According to an embodiment of the invention, the mobile unit 150 may be a tethered or a tether-free underwater device that may be autonomous, remotely operated, or diver-operated. FIG. 1A further illustrates a plurality of RFID tags 125 positioned along the submerged surface 101. In order to operate properly underwater, the RFID tags 125 are marinized by using standard potting methods for waterproofing, or other known methods. As shown in FIG. 1A, some of the tags 125 may be mounted in cluster formations 126, wherein the tags 125 in the cluster 126 are arranged more closely together than tags that are not in a cluster. FIG. 1C is an exemplary schematic illustration of an RFID tag cluster 126 that is made up of a plurality of RFID tags. FIG. 1C shows the cluster having a + shape, but tag clusters may have other shapes. Additionally, although FIG. 1A shows the surface 101 having only one tag cluster 126, the surface 101 may have as many clusters as desired. Depending on the surface 101, the RFID tags 125 may be magnetically mounted, or may alternatively mounted by using known adhesives or attachment devices. The RFID tags 125 may be Low Frequency (LF) passive tags, thereby minimizing power requirements and minimizing electronic noise within the system 10.

The RFID tags are positioned at precise predetermined positions along the surface 101. Each location is distinct, not only because of the position on the surface, but also because of the topography or other characteristics of the surface at that particular location. Each RFID tag 125 carries unique identification data related to its location. As outlined below, the mobile underwater unit 150 includes an RFID reader/interrogator 175, so that whenever the mobile unit 150 comes within a passive reading range of a tag 125, the reader 175 receives the unique identification data of that tag 125, and based on the reception of that data, the mobile unit 150 is able to determine its actual location.

FIG. 1A also shows underwater explorer 160, which may be a diver. The diver 160 may also travel along or over the surface 101. The diver 160 is also equipped with a reader/interrogator 175, which reads and provides the diver with unique identification data associated with the tags 125. The diver 160 may perform similar functions as the mobile unit 150, such as grooming and may also perform general maintenance or other marine-related tasks. The unique identification data provided by the tags 125 may be used to assist in the performance of the diver's functions.

Figure 1B:
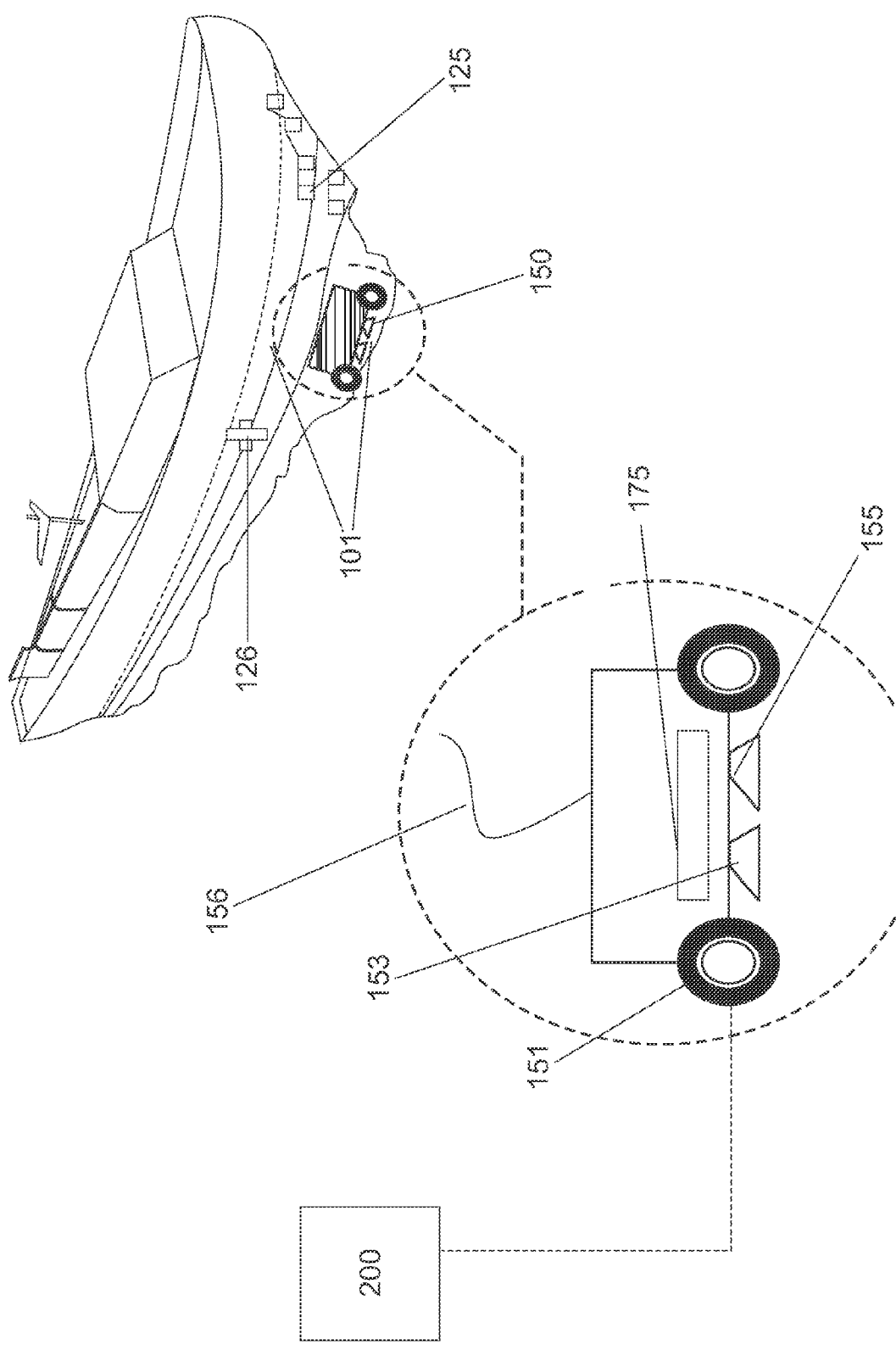
FIG. 1B is an illustration of an underwater location and hull grooming system utilizing an RFID arrangement, according to an embodiment of the invention.
Figure 1C:
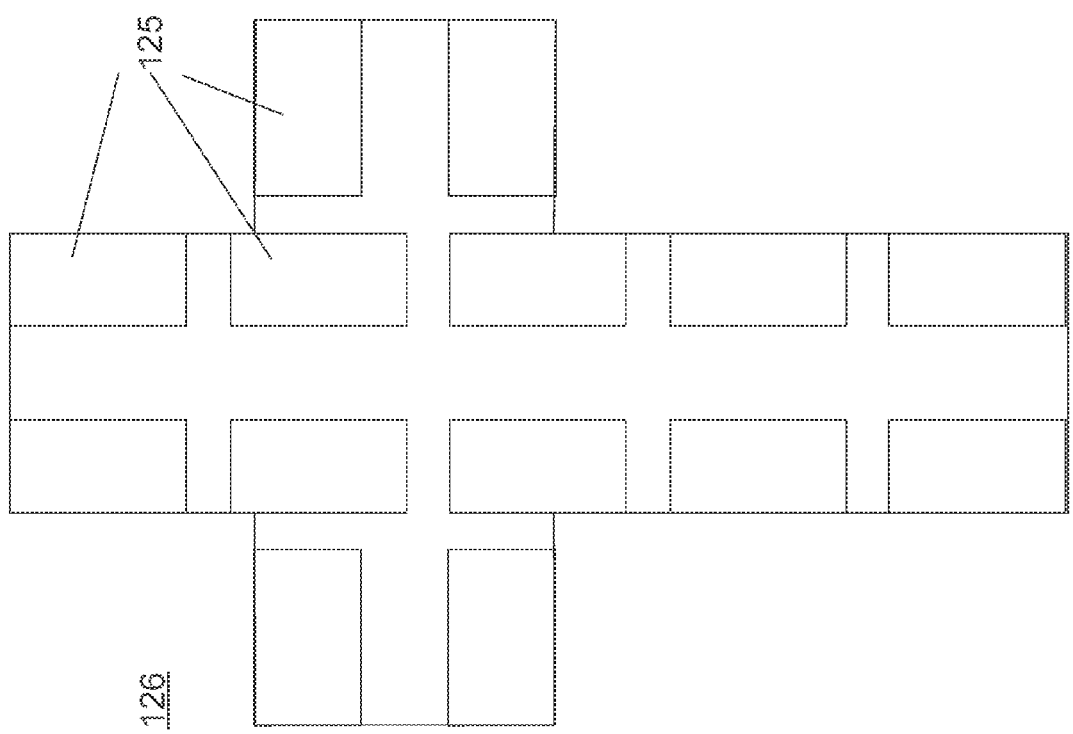
FIG. 1C is a schematic illustration of an RFID cluster, according to an embodiment of the invention.

FIG. 1B is an illustration of an underwater location and hull grooming system 100 utilizing an RFID arrangement, according to an embodiment of the invention. The system 100 of FIG. 1B is similar to that of the system 10 of FIG. 1A, with like elements being numbered similarly. FIG. 1B shows the surface 101 being the submerged hull surface of a ship. However, the hull surface 101 may be a surface of any water vessel, including for example the surface of a submarine. FIG. 1B further shows a plurality of RFID tags 125 arranged along the submerged hull surface. According to an embodiment of the invention, the tags may be spaced apart by about 6 inches to about 12 inches. FIG. 1B also shows a tag cluster 126. As stated above, although the figure shows only one tag cluster 126, as many tag clusters 126 as desired may be provided on the hull surface 101. Additionally, the tag clusters 126 may have any desired shape. According to an embodiment of the invention, the tags of the tag cluster 126 may be spaced apart by about 2 inches to about 6 inches.

According to the embodiment of FIG. 1B, the mobile underwater unit 150 is a hull grooming unit 150 that is provided to remove fouling from the hull surface 101 and to suppress the growth of early stage fouling. As shown in the magnified view, the hull grooming unit 150 includes one or more low pressure devices 153 and wheels 151 for maintaining proper contact with the hull surface 101, brushes 155 for removing and suppressing fouling, and an optional umbilical 156. The hull grooming unit 150 may also include grooming and cleaning tools such as jets, thermal and irradiative applicators, and the like, and combinations thereof. The grooming unit 150 may also be equipped with a sensor suite enabling hull inspection functions in addition to grooming functions. The components of the hull grooming unit 150 including sensors for differentiating between groomed and dirty portions of the hull surface are disclosed in related U.S. Provisional Patent Application 61/328,440, entitled "Miniature Robotic Hull Cleaning System" which is incorporated herein by reference for all that it discloses.

According to the embodiment of FIG. 1B, each RFID tag 125 has a unique identification number and ship location information programmed thereon. Thus for example, if a tag 125 is positioned at an upper edge of the keel, at a rudder, at a propeller, or at an edge of an intake opening, that specific information, related to the location at the keel, at a rudder, at a propeller, or at an edge of an intake opening, is associated with the unique identification number. RFID tags may have any desired dimension. As outlined below, the tag data is used to identify the location of the hull grooming unit 150 on the surface 101, and to provide navigational input.

As shown in FIG. 1B, the hull grooming unit 150, which may be remotely, autonomously, or diver controlled, further includes an RFID reader 175 for detecting the RFID tags 125, which are preferably LF passive tags. As the hull grooming unit 150 traverses submerged portions of the hull surface 101, the reader 175 detects the tags 125 and gathers the information thereon as the reader 175 moves within a passive detection range. The passive detection range is dependent upon a number of variables including size, form, and fit of the RFID tags, as well as reader antenna design, orientation, etc. According to an embodiment of the invention, the passive detection range is up to about 18 inches in calm conditions, and up to about 12 inches in condition in which cavitation is experienced. According to this embodiment, the hull grooming unit travels at about 0.5 m/s. As outlined above, each RFID tag 125 has a unique identification number and ship location information programmed thereon, each providing a virtual signpost as to where the hull grooming unit is located at a particular time. The reader 175 transmits the current RFID tag information to a host device 200. The host device 200 includes a system specific database that correlates that tag information to the actual hull position where the RFID tag was placed, by utilizing a lookup table for example.

Figure 2A:
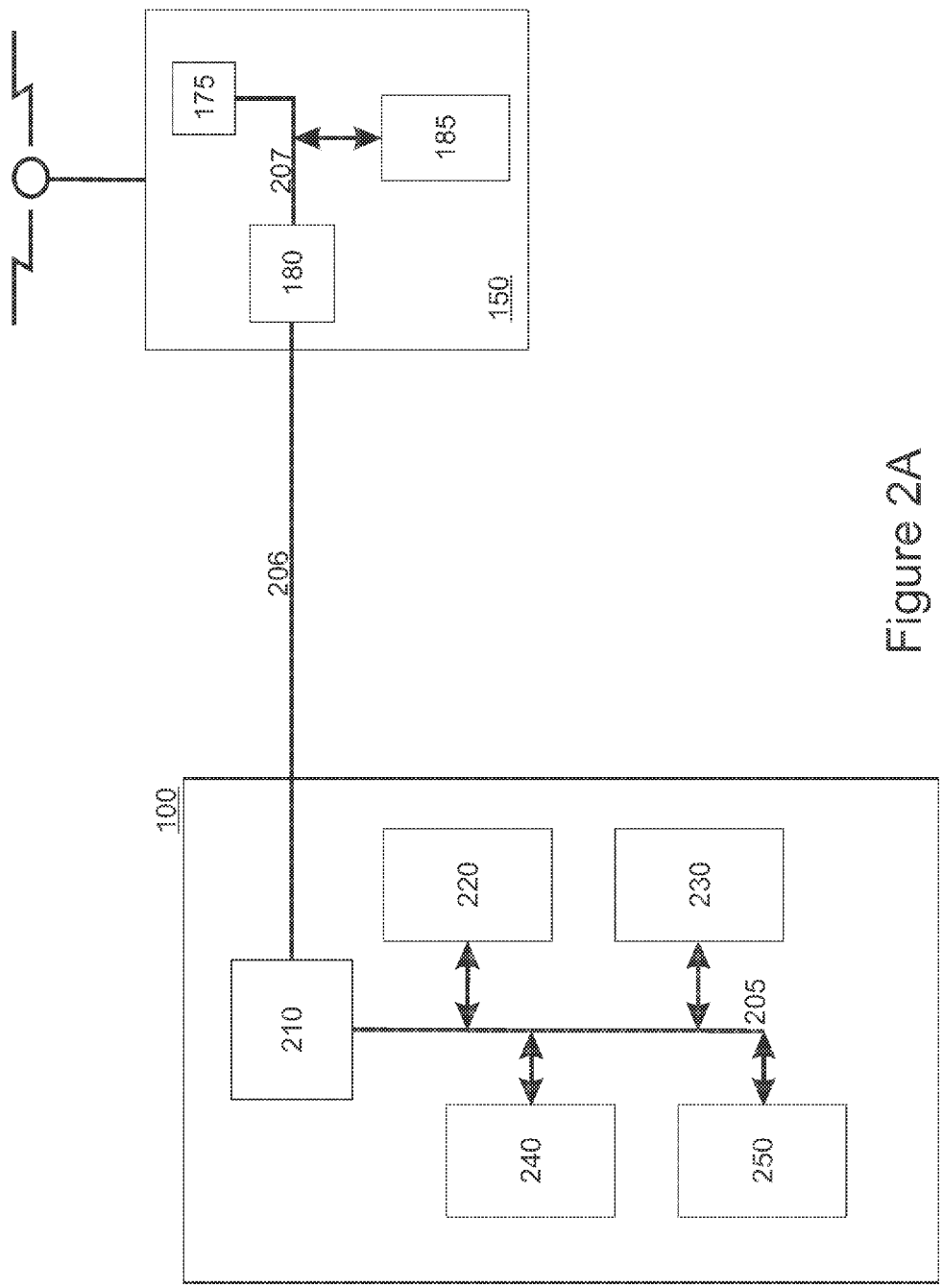
FIG. 2A is a block diagram of the hull grooming system, according to an embodiment of the invention.

FIG. 2A is a block diagram of the hull grooming system 100, according to an embodiment of the invention. FIG. 2A shows the host device 200, which may be an intelligent electronic device such as a laptop, a desktop, or a personally held computer, or any of a variety of other devices for which the ability to interface with other devices utilizing different types of communication protocols is desired. FIG. 2A shows the host device 200 having a central processing unit (CPU) 210, a main memory 220, a removable storage device 230, an input device 240, and a display device 250. Each of the constituent elements of the host device 200 is connected to one another through a bus 205, so that necessary information can be transmitted to the constituent elements.

The main memory 220 functions as a primary storage, and may be a Random Access Memory (RAM), a Read Only Memory (ROM) or a combination thereof. The removable storage device 230 provides additional data storage and may be a Compact Disc Read Only Memory (CD-ROM), magnetic tape, flash memory, PC-CARDS, or other portable storage device, or combinations thereof. The input device 240 may be a keyboard, touchpad, mouse, joystick, a remote device, a microphone, or combinations thereof. The input display 250 may be a LCD, flat panel display, etc. According to an embodiment of the invention, the display 250 may also be an input device such as a touch screen display.

As stated above, the host device 200 is equipped to, and runs one or more system specific hull positioning programs for determining the exact location of the hull grooming unit 150 on the hull surface 101. The one or more hull positioning program may be stored on any of the computer readable mediums outlined above in the main memory 220 and/or the removable storage device 230. FIG. 2A shows the host device 200 interfacing with the hull grooming unit 150, via the input/output bus 206. The interface between the host device 200 and the hull grooming unit 150 may be a wireless interface, such as the well-known Infrared Data Association (IrDA) interface or a Radio Frequency (RF) interface such as the well-known Bluetooth RF interface. In embodiments in which the hull grooming unit 150 is equipped with an umbilical 156, the interface between the host device 200 and the unit 150 may be a wireline interface such as a universal serial bus (USB) which may be Recommended Standard 232 (RS-232), Enhanced Parallel Port (EPP), Small Computer System Interface (SCSI), or Integrated Drive Electronics (IDE) connectors.

FIG. 2A also shows the hull grooming unit 150 including CPU 180 for controlling the operations of the unit 150. The CPU controlled operations include amongst other things, hull grooming operations and navigation operations including speed and direction controls. The hull grooming unit 150 also includes a main memory 185, which may be RAM, ROM, or combinations thereof. As outlined above, the hull grooming unit 150 also includes an RFID reader/interrogator 175, provided for detecting the RFID tags 125 positioned along the submerged surface 101 of the hull. FIG. 2A also shows bus 207 that connects each of the constituent elements of the hull grooming unit 150, so that necessary information can be transmitted to the constituent elements.

The hull grooming unit 150 is also provided with a navigation program stored on the memory 185, which together with the RFID reader 175, functions as a navigation system. The navigation system utilizes data received by the RFID reader 175 to aid navigation, and ultimately, grooming operations of the hull grooming unit. As outlined above, the RFID tags 125 are positioned at specific locations along the surface of the hull with each RFID tag 125 carrying information specific to its location, thus allowing each tag to act as a virtual signpost. According to an embodiment of the invention, the tags 125 are positioned so that only one tag 125 at a time is within the detection range of the RFID reader 175. This allows the RFID reader 175 to track and update location data one tag at a time.

As the hull grooming unit 150 travels along the hull surface 101, the RFID reader 175 detects the tags 125 and transmits tag-information to the host device 200 via the interface 206. As stated above, the host device 200 includes one or more system specific hull positioning programs. The output data stream of the hull grooming unit 150 is calibrated by the one or more hull positioning programs used in real time to provide the actual location/tracking of the unit 150. The location/tracking may be accomplished by the one or more system specific hull positioning programs by correlating the tag information to the actual hull position where the RFID tag was placed via a lookup table, for example.

Regarding the one or more system specific hull positioning programs associated with the host device 200, any verified, system specific, hull or vessel positioning program, such as NAVMODEL for example, may be employed. NAVMODEL is a U.S. Navy hull modeling software application that can, when used in conjunction with an acoustic type navigation system, indicate the precise location of a surveyed fixed point on various ship hull types. When executing the hull positioning program such as NAVMODEL, the CPU 210 loads processor instructions from a computer readable medium and executes the program instructions in a known manner. The computer readable medium utilized may be the main memory 220, which may be RAM or ROM. The computer readable medium may also be the removable storage device 230, which may be a CD-ROM, magnetic tape, flash memory, PC-CARDS, or other portable storage devices.

The navigation system of the grooming unit 150, which includes the navigation program and the RFID reader 175, is compatible with the one or more system specific hull positioning programs, and may be a Short Base Line (SBL) or Long Base Line (LBL) based acoustic navigation system. Such an acoustic based navigation system would have a desired intrinsic bandwidth, which would allow for reliable two-way communications and precision timing. The actual location of the grooming unit 150, as calibrated by the one or more hull positioning programs of the host device 100, may be used by an operator or by the navigation system of the hull grooming unit 125, to control subsequent movement of the grooming unit 150.

According to another embodiment, in addition to the dispersed RFID tag 125, the hull surface 101 may also include tag clusters 126 as shown in FIGS. 1A and 1B. As outlined above, each RFID cluster 126 is made up of a plurality of RFID tags 125 arranged in a tight knit close arrangement, in which the RRID tags 125 of the cluster 126 are arranged closer than RFID tags 125 that are not arranged in a cluster. Because of the close arrangement of the tags 125 in the cluster 126, typically more than one of the tags 125 in a cluster 126 maybe detectable by an RFID reader 175 at a given time. Additionally, because of the proximity of RFID tags 125 with respect to other RFID tags 125 within a cluster 126, tags may be sequentially readable by an RFID reader 175 at predetermined intervals, which is not possible with RFID tags 125 that are not in a cluster 126. The sequence in which a two or more RFID tags 125 within a cluster 126 are read, may be used to the direction of travel and the orientation of the hull grooming unit 150.

Figure 2B:
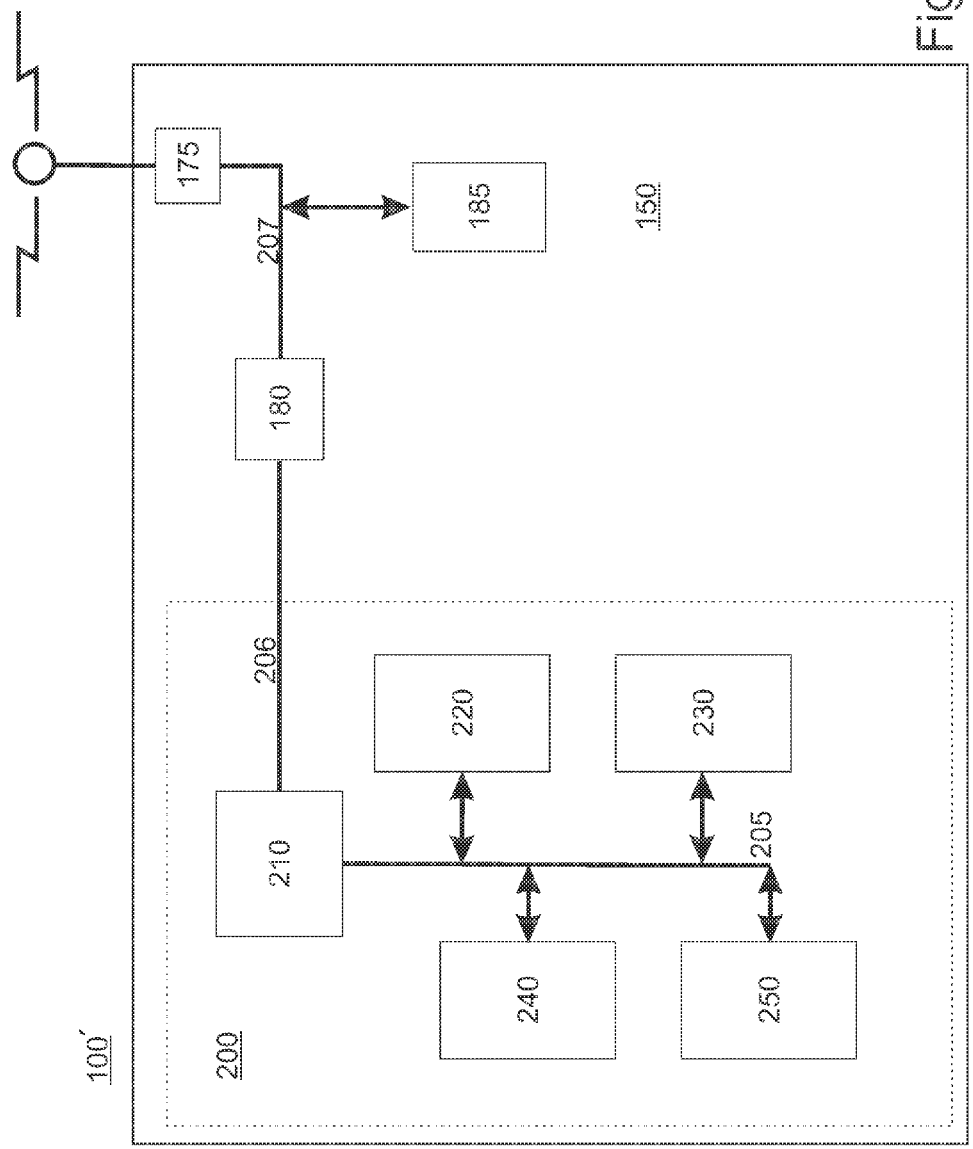
FIG. 2B is a block diagram of the hull grooming system, according to an embodiment of the invention.
Figure 2C:
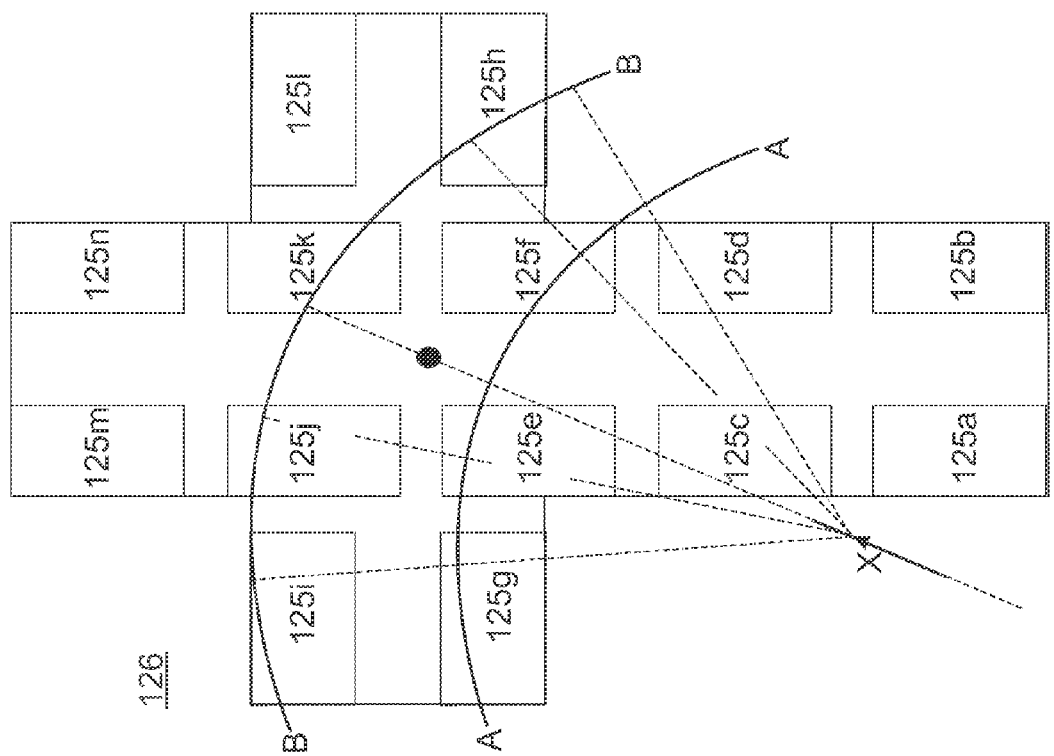
FIG. 2C is an explanatory illustration of direction and orientation determination using an RFID cluster, according to an embodiment of the invention.

FIG. 2C is an explanatory illustration of direction an orientation determination according to an embodiment of the invention. FIG. 2C shows the tag cluster 126 of FIG. 1C, with the RFID tags 125 labeled 125a to 125n. According to this embodiment, the hull grooming unit 150 is travelling and in a position so that RFID tags 125a to 125g are detected by the RFID reader 175 of the hull grooming unit 150. The tags 125a to 125g fall within a detection arc A. After a predetermined interval, tags 125h to 125k are also detected by the RRID reader 175, the tags 125h to 125k enveloped within a new detection arc B. Given this information the CPU 210 may determine the direction of travel of the unit 150, based on the difference between the detection arc A and detection arc B. As illustrated in FIG. 2C, a travelling direction X is determined. Additionally, based on the known configuration of the unit 150 and the location of the RFID reader 175, the CPU 210 may also determine the orientation of the unit 150. Thus in addition to location data, the CPU 210 may also process orientation and direction data.

FIG. 2B is a block diagram of the hull grooming system 100', according to an embodiment of the invention. In the embodiment of FIG. 2B, the host device 200 and associated components are located on the hull grooming unit 150. Thus, as illustrated, the hull grooming unit 150 includes the CPU 210, the main memory 220, the removable storage device 230, and input device 240. The hull grooming unit 150 may also include a display 250, depending on the embodiment. The elements are all waterproofed, and are held within a chassis of the hull grooming unit 150. The operation of the elements as shown in FIG. 2B is similar to the operation as outlined above in the description of FIG. 2A, and thus the hull grooming unit 150 performs similar functions as outlined above with respect to FIG. 2A. With respect to the hull grooming system 100', interfacing among elements such as the RFID reader/interrogator 175, and the CPU 210 is more direct because the elements are all physically located on the unit 150. Additionally, according to this embodiment, the CPUs 180 and 210 may be a single CPU unit. Alternatively, the CPUs 180 and 210 may include a plurality of sub-modules. The hull grooming system 100' may be applicable to situations in which the unit is diver operated or autonomously controlled.

As outlined above, the hull grooming unit 150 may be remotely controlled, diver controlled, or may be autonomous. When the hull grooming unit 150 is remotely controlled, the arrangement 100 of FIG. 2A may be used, with an operator having access to the remotely located host device 200. According to this embodiment, the hull or vessel positioning software, such as NAVMODEL, monitors the data produced by the navigation system in real time and uses the data to update the information presented to an operator. The position of the grooming unit 150 with respect to the hull surface 101 may be shown on the display 250, which may provide a virtual replication of the submerged hull surface and the location of the underwater vessel thereon. Based on the displayed representation of the grooming unit 150 with respect to the hull surface 101, the operator may enter navigational directives via the input (240 or 250), according to operational desires. Thus for example, if the display indicates that the hull grooming unit 150 is approaching an intake or a moving part such as a rudder, the operator may enter a command to reduce the speed, stop the advancement or alter the path of the unit 150. If there are no obstacles to be avoided, the operator may allow the unit 150 to continue on a predetermined path. A similar process occurs when the unit 150 is operated by a diver. When operated by a diver, the arrangement 100' of FIG. 2B may be used.

In embodiments in which the hull grooming unit 150 is autonomously controlled, the navigation system may be equipped with a fixed position reference sensor. When equipped with the fixed position reference sensor, the NAVMODEL or other system specific application(s) may perform dynamic recalibration of the fix provided by the navigation system without operator intervention. According to this embodiment, the navigation system of the unit 150 may have one or more programmed paths. The tag data provided by the reader 175 is used to dynamically control the navigation path of the hull grooming unit 150, in accordance with the operational directives of the navigation program. Thus for example, if the NAVMODEL or other similar application determines that the hull grooming unit 150 is approaching an intake or a moving part such as a rudder that has a known location, the navigation system, according to programmed responses, may reduce the speed, stop the advancement, or alter the path of the unit 150. If there are no obstacles to be avoided, the navigation system may allow the unit 150 to continue on a predetermined path. When autonomously controlled the arrangements 100 and 100' of FIGS. 2A and 2B respectively, may be used.

What has been described and illustrated herein are preferred embodiments of the invention along with some variations. The terms, descriptions and figures used herein are set forth by way of illustration only and are not meant as limitations. For example, the RFID system as disclosed herein may be used to survey different underwater environments. Thus RFID tags may be placed on objects that are underwater or may be positioned along an ocean floor, for example. An underwater vehicle that may be remotely operated, or diver operated, may be equipped with a RFID reader that reads information embedded on RFID tags. Alternatively, a diver may be equipped with a RFID reader that reads information embedded on RFID tags. Based on information received, the underwater vehicle/diver would be able to survey the environment. If for example, the tags are attached to objects that are located underwater, the tags may include information pertaining to the type of object and the location of the object. The subsurface vehicle/diver, having the reader, may be used to verify or check the position of the underwater objects, or may merely be used to collect data provided on the tags. The collected data may be utilized to impact future operations of the subsurface vehicle/diver, or may be used for other purposes. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. An underwater operations optimization system comprising:
    a water vessel having a submerged hull surface;
    a plurality of radio frequency identification tags positioned along the submerged hull surface, wherein each tag of said plurality of tags has unique identification data related to the positioning of said tag on the hull surface, and wherein each radio frequency identification tag is a passive low frequency tag;
    an underwater explorer for travelling along the submerged hull surface, the underwater explorer having a radio frequency identification reader associated therewith, for reading the unique identification data of each said tag when the reader comes within a reading range, wherein the underwater explorer is an underwater vessel, the underwater operations optimization system further comprising:
    a host device associated with the underwater vehicle, the host device comprising a host processor and computer-readable medium associated therewith the host processor receives tag, data from the underwater vehicle, and the computer-readable medium having stored thereon instructions which, when executed by the host processor, cause the host processor to perform the steps of;
        matching the received tag data with data on a look-up table; and
        based on matched data, associating the tag data with a know location on the hull to determine the vessel location on the hull.

2. The underwater operations optimization system of claim 1 wherein at least a portion of the plurality of radio frequency identification tags are arranged in one or more clusters, wherein in each cluster, the underwater tags are in closer proximity to each other as compared to the underwater tags that are not in a cluster, and wherein based on the proximity of radio frequency identification tags with respect to other radio frequency identification tags within a cluster, the radio frequency identification reader simultaneously reads a plurality of radio frequency identification tags within the cluster, said simultaneous readings being performed sequentially and at predetermined intervals to make a determination as to the location, the direction of travel and the orientation of the underwater vehicle.

3. The underwater operations optimization system of claim 2, wherein the underwater vehicle further comprises a vehicle processor for controlling the operations of the underwater vehicle, and vehicle computer-readable medium associated therewith, wherein in an autonomous mode the vehicle processor receives vehicle location information from the host device, and the vehicle computer-readable medium having stored thereon instructions which, when executed by the processor, causes the vehicle processor to perform the step of controlling subsequent operation of the underwater vehicle based on the known location of the underwater vehicle.

4. The underwater operations optimization system of claim 3, wherein the underwater vehicle is a hull-cleaning vehicle having cleaning brushes for removing or suppressing the growth of fouling from the submerged hull surface, and wherein the controlling of subsequent operation of the underwater vehicle based on the actual known location of the underwater vessel, includes controlling the speed, direction, or combinations thereof, of the underwater vehicle.

5. The underwater operations optimization system of claim 4, wherein the host device is remote from the underwater vehicle, and further comprises a display for illustrating a virtual replication of the submerged hull surface and the location of the underwater vessel thereon.

6. The underwater operations optimization system of claim 2, wherein the underwater vehicle further comprises a vehicle processor for controlling the operations of the underwater vehicle, and vehicle computer-readable medium associated therewith, wherein in an operator-controlled mode the vehicle processor receives operator inputted navigation commands based on the known location of the underwater vehicle, via the host device, and the vehicle computer-readable medium having stored thereon instructions which, when executed by the processor, causes the vehicle processor to perform the step of controlling subsequent operation of the underwater vehicle based on the operator inputted navigation commands.

7. The underwater operations optimization system of claim 6, wherein the underwater vehicle is a hull-cleaning vehicle having cleaning brushes for removing and suppressing the growth of fouling from the submerged hull surface, and wherein the controlling of subsequent operation of the underwater vehicle based on the known location of the underwater vessel, includes controlling the speed, direction, or combinations thereof, of the underwater vehicle.

8. The underwater operations optimization system of claim 7, wherein the host device is remote from the underwater vehicle, and further comprises:
a display for illustrating a virtual replication of the submerged hull surface and the location of the underwater vehicle thereon;
an input device for receiving operator input commands for controlling the subsequent operation of the underwater vehicle based on the known location of the underwater vehicle.

9. The under water operations optimization system of claim 5, wherein the radio frequency identification tags are magnetically attached to the submerged hull surface.

10. The underwater operations optimization system of claim 8, wherein the radio frequency identification tags are magnetically attached to the submerged hull surface.

11. An underwater location system comprising:
a plurality of radio frequency identification tags positioned along an underwater surface, wherein each tag of said plurality of tags has unique identification data related to the positioning of said tag on the surface, and wherein each radio frequency identification tag is a passive low frequency tag;
an underwater explorer for travelling in close proximity to the underwater surface, the underwater explorer having a radio frequency identification reader attached thereon, for reading the unique identification data of each said tag when the reader comes within a reading range as the underwater explorer travels in close proximity to the underwater surface, wherein the underwater explorer is an underwater vessel, the underwater location system further comprising:
a host device associated with the underwater vehicle, the host device comprising host processor and computer-readable medium associated therewith, the host processor receives unique tag data read transmitted by the radio frequency reader of the underwater vehicle, and the computer-readable medium having stored thereon instructions which, when executed by the host processor, causes the processor to perform the steps of;
matching the received unique identification tag data with data on a look-up table; and
based on matched data, associating the unique identification tag data with a known location on the underwater surface thereby determining the location of the underwater vessel.

12. The underwater location system of claim 11, wherein at least a portion of the plurality of radio frequency identification tags are arranged in one or more clusters, wherein in each cluster, the underwater tags are in closer proximity to each other as compared to the underwater tags that are not in a cluster, and wherein based on the proximity of radio frequency identification tags with respect to other radio frequency identification tags within a cluster, the radio frequency identification reader simultaneously reads a plurality of radio frequency identification tags within the cluster, said simultaneous readings being performed sequentially and at predetermined intervals to make a determination as to the location, the direction of travel, and the orientation of the underwater vehicle.

13. The underwater location system of claim 12, wherein the underwater vehicle is a hull-cleaning vehicle having cleaning brushes for removing or suppressing the growth of fouling from the submerged hull surface.

14. The underwater location system of claim 13, wherein the underwater vehicle comprises a vehicle processor and computer-readable medium associated therewith, the vehicle processor electronically connected to host device,
a vehicle processor for controlling the operations of the underwater vehicle, and vehicle computer-readable medium associated therewith, wherein in an autonomous mode the vehicle processor receives vehicle location information from the host device, and the vehicle computer-readable medium having stored thereon instructions which, when executed by the processor, causes the vehicle processor to perform the step of controlling subsequent operation of the underwater vehicle based on the known location of the underwater vehicle.

15. The underwater location system of claim 13, wherein the underwater vehicle comprises a vehicle processor and computer-readable medium associated therewith, the vehicle processor electronically connected to host device,
a vehicle processor for controlling the operations of the underwater vehicle, and vehicle computer-readable medium associated therewith, wherein in an operator-controlled mode the vehicle processor receives operator inputted navigation commands based on the known location of the underwater vehicle, via the host device, and the vehicle computer-readable medium having stored thereon instructions which, when executed by the processor, causes the vehicle processor to perform the step of controlling subsequent operation of the underwater vehicle based on the operator inputted navigation commands.

16. The underwater location system of claim 13, wherein the host device is remote from the underwater vehicle, and further comprises:
   a display for illustrating a virtual replication of the underwater surface and the location of the underwater vehicle thereon; and
   an input device for receiving operator input commands for controlling the subsequent operation of the underwater vehicle based on the known location of the underwater vehicle.

17. The underwater operations optimization system of claim 2 wherein the one or more clusters have a cross shape having two columns of radio frequency identification tags in the vertical section portion of the cross.

18. The underwater location system of claim 12 wherein the one or more clusters have a cross shape having two columns of radio frequency identification tags in the vertical section portion of the cross.

* * * * *